United States Patent
Hardie (10) Patent No.: US 9,553,801 B2
(45) Date of Patent: Jan. 24, 2017

(54) NETWORK DEVICE

(71) Applicant: Google Inc., Mountain View, CA (US)

(72) Inventor: Edward Thomas Lingham Hardie, Redwood, CA (US)

(73) Assignee: Google Inc., Mountain View, CA (US)

( * ) Notice: Subject to any disclaimer, the term of this patent is extended or adjusted under 35 U.S.C. 154(b) by 455 days.

(21) Appl. No.: 13/626,719

(22) Filed: Sep. 25, 2012

(65) Prior Publication Data

US 2014/0086254 A1   Mar. 27, 2014

(51) Int. Cl.
  *H04L 12/773* (2013.01)
  *H04L 12/28* (2006.01)
  *H04L 12/751* (2013.01)
  *H04L 12/24* (2006.01)

(52) U.S. Cl.
  CPC .............. *H04L 45/60* (2013.01); *H04L 12/28* (2013.01); *H04L 41/04* (2013.01); *H04L 45/02* (2013.01)

(58) Field of Classification Search
  CPC .......... H04L 45/02; H04L 45/04; H04L 12/28; H04L 45/60; H04L 41/04
  See application file for complete search history.

(56) References Cited

U.S. PATENT DOCUMENTS

| | | | |
|---|---|---|---|
| 2005/0152298 A1 | 7/2005 | Thubert et al. | |
| 2006/0031506 A1* | 2/2006 | Redgate | 709/226 |
| 2006/0104226 A1 | 5/2006 | Ahn | |
| 2006/0104296 A1* | 5/2006 | Rodrigo | 370/403 |
| 2009/0260023 A1* | 10/2009 | Murthy et al. | 719/330 |
| 2009/0292824 A1* | 11/2009 | Marashi et al. | 709/247 |
| 2010/0251335 A1* | 9/2010 | Srisuresh et al. | 726/3 |
| 2011/0085510 A1 | 4/2011 | Dunk | |
| 2011/0255418 A1* | 10/2011 | van Greunen et al. | 370/242 |
| 2011/0292878 A1* | 12/2011 | Ozawa | 370/328 |
| 2011/0307629 A1* | 12/2011 | Haddad | 709/245 |
| 2011/0310898 A1* | 12/2011 | Alkhatib | 370/392 |

(Continued)

OTHER PUBLICATIONS

Durand, A. et al., "Dual-Stack Lite Broadband Deployments Following IPv4 Exhaustion" accessed at http://tools.ietf.org/html/rfc6333, May 24, 2012.

(Continued)

*Primary Examiner* — Alpus H Hsu
*Assistant Examiner* — Anthony Luo
(74) *Attorney, Agent, or Firm* — McDermott Will & Emery LLP (57) ABSTRACT

A network device may comprise storage media configured to store traffic, instructions for a lookup engine, a map manager, a traffic forwarder, and a map. The map may comprise rules associating IPv4 and IPv6 addresses. The traffic forwarder may be configured to forward outbound traffic to the second device. The lookup engine may comprise instructions to cause the processor to check the map to determine whether the map comprises a rule associating the second address of the second device and the first address of the first device. If so, the instructions may cause the processor to forward the inbound traffic from the second device to the first device. If the map does not comprise this rule, the instructions may cause the processor to send a query to a second network device asking whether the second network device comprises a rule associating the first and second address.

22 Claims, 6 Drawing Sheets

(56) References Cited

U.S. PATENT DOCUMENTS

2011/0317554 A1* 12/2011 Greenberg et al. .......... 370/230
2012/0176932 A1   7/2012 Wu et al.
2012/0207168 A1   8/2012 Kassi Lahlou et al.
2013/0254359 A1*  9/2013 Boutros ................ H04L 61/103
                                                   709/223

OTHER PUBLICATIONS

International Search Report issued Dec. 26, 2013 in PCT Application No. PCT/US2013/059018.
International Preliminary Report on Patentability mailed Apr. 9, 2015 in PCT Application No. PCT/US2013/059018 (9 pages).
Extended European Search Report issued Apr. 21, 2016 in European Patent Application No. 13840725.9.

* cited by examiner

NETWORK DEVICE

BACKGROUND

The current version of internet protocol, IPv4 (Internet Protocol version 4), is running out of address space to deploy new addresses. A new version, IPv6, has been developed with a much larger address space and is in the early phase of deployment. During this period of utilization of IPv4 and IPv6, one method of achieving deployment has been to run "Dual-stack," an approach featuring a node having both an IPv4 and an IPv6 address. This approach allows a node to reach IPv4-only destinations, but ultimately does not save any IPv4 address space. Alternatively, use of non-unique private IPv4 addresses (also called RFC 1918 (Request for Comment) addresses) along with public IPv6 addresses has been developed, but such an approach may require a standard IPv4 NAT (Network Address Translation) in the network along with all the usual methods for distributing and managing those private addresses at the hosts.

Another approach, called "Dual-stack lite" or "DS-lite" has been developed and standardized in RFC 6333 (http://tools.ietf.org/html/rfc6333 on May 24, 2012). For DS-Lite, the host uses an IPv6 transport to reach an AFTR (Address Family Translator), which connects to IPv4 addresses (and potentially also acts as a NAT). The Address Family Translator may be an independent device but may also function within a network device (e.g. a router) already deployed in the network. When a DS-lite encapsulated packet reaches the AFTR, it removes the encapsulation and forwards the internal packet after performing any network address translation required.

SUMMARY

A first network device is described. The network device may comprise tangible computer readable storage media configured to store traffic information, instructions for a lookup engine, a map manager, a traffic forwarder, and a map. The network device may also comprise a processor configured to store information in the storage media; and execute instructions stored in the lookup engine. The first address input may be configured to receive outbound traffic from a first device at a first address. The outbound traffic may comprise a data packet and a second address for a second device.

The map manager may be configured to generate the map stored in the storage media. The map may comprise rules associating the first address and the second address. The traffic forwarder may be configured to forward the outbound traffic to the second device. The second address input may be configured to receive return traffic from the second device directed to the first device.

The lookup engine may comprise instructions to cause the processor to check the map to determine whether the map comprises a rule associating the second address of the second device and the first address of the first device. If the map comprises this association, the instructions in the engine may cause the processor to forward the return traffic from the second device to the first device. If the map does not comprise this association, the instructions may cause the processor to send a query to a second network device. The query may ask the second network device whether it comprises a rule having an association of the second address and the first address.

The network device may comprise a network device input configured to receive a response to the query from a second network device. The network device may also comprise a map updater configured to update the map based on the response from the query.

BRIEF DESCRIPTION

DETAILED DESCRIPTION

A network is provided that transfers packets from a first device at an IPv4 address to a second device at an IPv6 address, and may return packets from the second device to the IPv4 device without the return pathway necessarily flowing through the same network device (e.g. routers, switches, load balancers, etc). In other words, a network is described that provides bidirectional IPv4-IPv6 communication, wherein the IPv4→IPv6 pathway may be different than the IPv6→IPv4 pathway.

Network emitting traffic elements (sources of outgoing traffic) make their own calculations of the shortest path to the network holding the address in which the packet is destined Because the calculations are independent from one another, the source of the first packet may determine one route as best (shortest) while the response packet's emitting network (where source and destination are flipped) may determine a different route as shortest. This frequently occurs when the two networks are connected in multiple places, as one network may route toward interconnection point 1 and the other toward interconnection point 2. An interconnection point is a location where two networks connect and exchange routes/traffic. Some interconnection points are provided by facilities, but other connections points may be private bilateral interconnection points. If the network devices in the IPv6→IPv4 pathway do not contain mapping data (or at least have a way of obtaining it) between the IPv6 and IPv4 addresses, the network device will not be able to deliver the return packet from the IPv6 device to the IPv4 device since there is no correlation between an IPv4 address and an IPv6 address.

In an illustrative configuration, a network comprises N network devices, M switches, and X devices. The network provides a bidirectional pathway from a first device through at least one network device and one switch to a second device. In some configurations, the first device has an IPv6 address and the second device has an IPv4 address. The network device may be configured to record a rule associating the addresses of the first and second devices. The network device may be capable of forwarding inbound traffic from the second device to the first device using this rule. The pathway for the inbound traffic (i.e. the return transmission), may or may not pass through the same network device the outbound traffic passed through. In some configurations, the network device selected for the inbound traffic comprises a query generator configured to generate queries to other network devices to determine whether they comprise a rule associating the addresses of the first and second device.

There are many way to configure how a network device can generate and transfer such a query. For example, the network device may query each network device sequentially until it obtains the needed rule or determines the rule is not available from any of the network devices. Another configuration is to use a ring topology, wherein a first network device asks a second network device whether it comprises a map having a specified rule. If the second network device does not comprise the rule, the second network device may send the request to a third network device. If the third network device comprises the rule, it may be configured to send a copy of the rule to the first network device.

A master controller may be used, which may comprise a map with all of the rules, wherein each network device sends a copy of any new rules they store so that each network device need only check with the master controller to acquire a copy of a rule not stored locally at the network device. These and other configuration are described with reference to the figures below.

In some configurations, an OpenFlow Switching Specification may be used to provide a protocol in which the network devices may communicate with one another and/or the master controller. OpenFlow is a communication protocol that uses a split control plane and data plane. That is, a network implementing OpenFlow may comprise a set of tables with rules in them, such as, "If this packet characteristic matches element X, perform function Y."

Figure 1A:
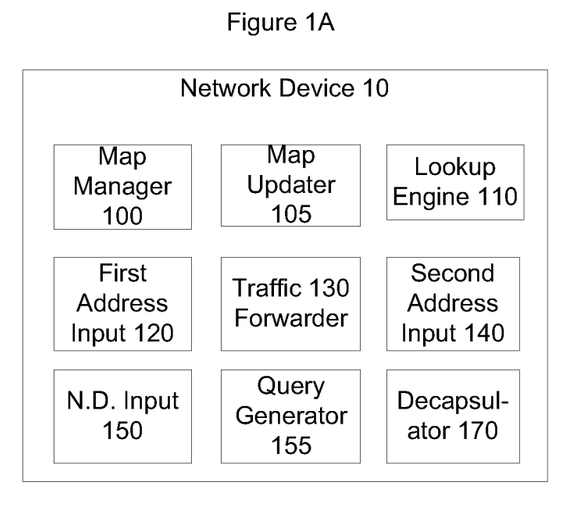
FIGS. 1A and 1B are illustrative component views of the network device.
Figure 1B:
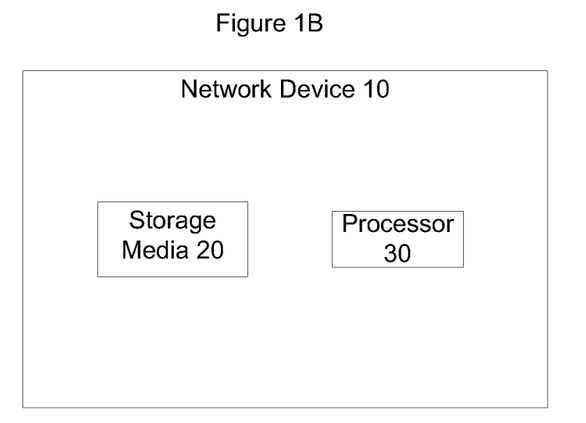

FIG. 1A illustrates a component view of the network device 10. The components illustrated in FIG. 1A are the map manager 105, the map updater 105, the lookup engine 110, the first address input 120, the traffic forwarder 130, the second address input, the network device (N.D.) input 150, the query generator 155, and the decapsulator 170. Referring to FIG. 1B, these components may take the form of specific computerized instructions, and they may be stored on tangible computer readable storage media 20. A processor 30 may be configured to execute these components to implement a number of different functions discussed below. The components may also take the form of specialized circuitry for implementing these functions.

Figure 2:
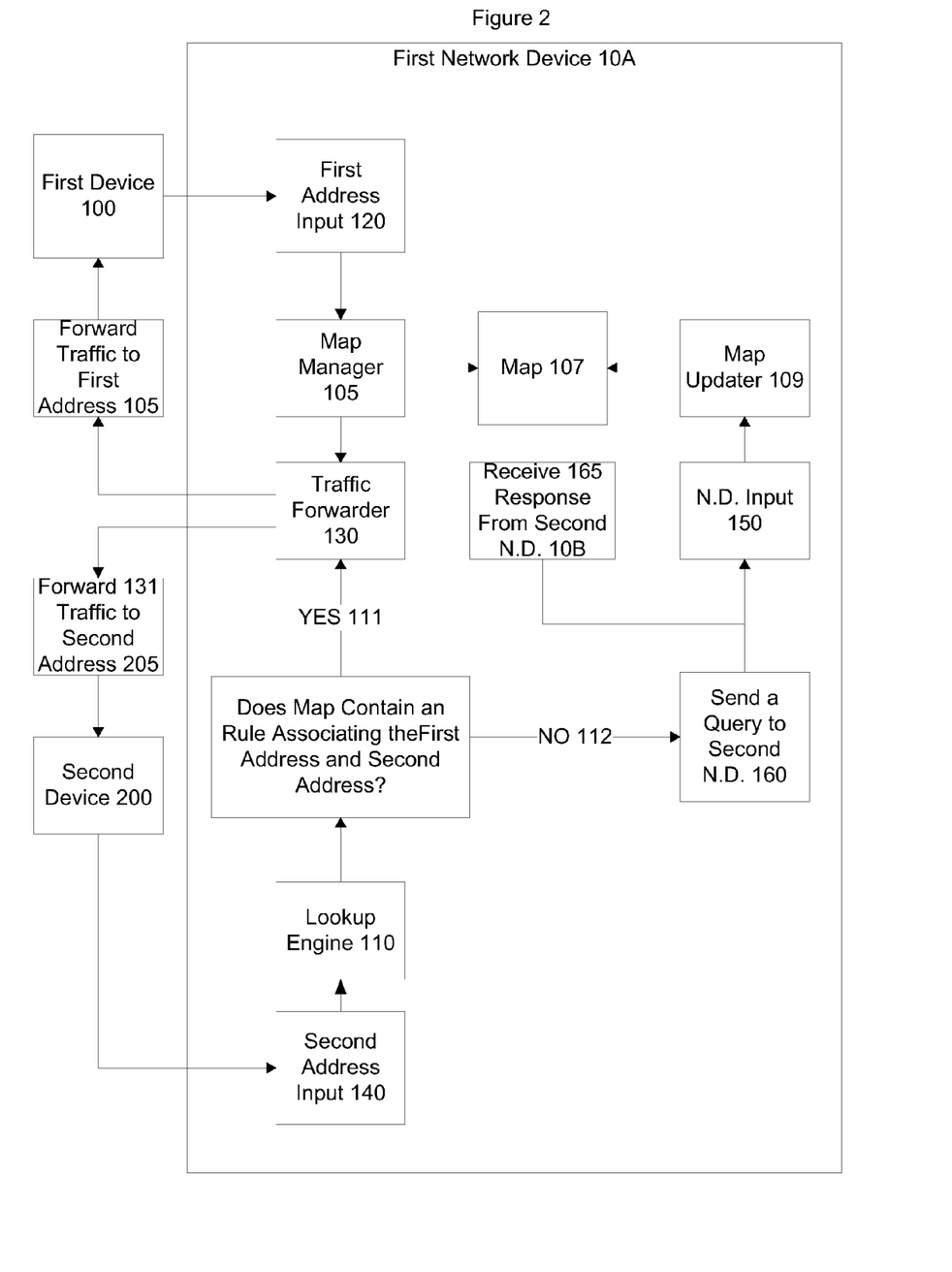
FIG. 2 is an illustrative process flow of data through the network device.

FIG. 2 illustrates a first network device 10A. Boxes and arrows shown inside the first network device 10A box are components and processes performed by the first network device, whereas boxes and arrows shown outside the first network device 10A box are not performed by the first network device 10A, in this embodiment. The first device 100 may be connected to a network. The first device 100 has a first network address 105. The first network address may be an IPv4 address. The first device may be programmed to send a data packet to a second device 200 having a second address 205. The second address may be an IPv6 address. As shown, first device 100 may send a data packet which is received by first N.D. (network device) 10A at the first address input 120.

The first network device 10A may execute the map manager 105 to create or update map 107. Map 107 may contain rules comprising associations between two or more addresses. When the map manager 105 receives the data packet from the first device 100, it may create the following rule: if a packet is received from the second device 200 at address 205, then transfer the packet to the first device at address 105. Traffic forwarder 130 may be configured to forward data packets to and from the first and second devices (and additional devices not shown). The instructions as to what address to send to may be obtained from the map 107.

Once the traffic forwarder 130 forwards 131 the packets to the second device 200, the second device may process the data. The second device may send a data packet back to the first device (or to a third device, not shown). The communication from the second device may be received at the second device input 140. A lookup engine 110 may generate a query to be checked against the rules in the map 107. In this case, the query can request the map manager 105 to determine whether the map comprises rules on how to deliver a message to the first device 100. Depending on the implementation, the answer may be yes or no. If the answer is yes, 111, the map manager may instruct the lookup engine to send the packet to the traffic forwarder 130. The map manager may supply the traffic forwarder (or the lookup engine 110) with the address of the first device 100. In some embodiments, the lookup engine may access the map 107 without accessing the map manager 105. If the map does not comprise instructions on how to deliver a message to the first device 100 (i.e. a "no" decision 112), the first network device 10A may generate a query using the query generator 155. The query may be sent 160 to one or more other network devices.

In FIG. 2, the query is sent to a second network device. The first network device 10A may receive 165 a response from the second network device 10B, but in other embodiments, the response may come from a third, fourth, fifth, or Nth network device. The response from the second network device may comprise the needed rule, or it may comprise a response indicating the second network device 10B does not comprise the requested rule. Assuming the former is received, the map updater 109 may update the map 107 with the new rule. Using the new rule, the first network device 10A can direct the traffic forwarder 130 to deliver the data packet to the first device 100.

IPv4 data packets sent from the first device at the IPv6 address may be encapsulated. Encapsulation may provide a way of logically separating functions in the network from their underlying structure through abstraction. In an encapsulated communication pathway, higher level objects may be included in underlying structures thereby hiding the information from the underlying structures. In an illustrative example, a dual stack lite device having an IPv6 address is configured to send a data packet to a second device at an IPv4 address by way of an address family translating router. The dual stack lite device may be configured to encapsulate return data into the output traffic so that the AFTR can return traffic from the IPv4 device to the dual stack lite device. The AFTR may use this return data to construct a mapping so that future communications the AFTR receives from the IPv4 device may be routed to the desired IPv6 device. The return data may include a "mailbox" address in IPv4 address space and the actual IPv6 address on the dual stack lite device. The AFTR may store this mapping of the "mailbox" IPv4 address and IPv6 on storage media, so that the AFTR can determine what IPv6 device should receive packets addressed the IPv4 address. Because network infrastructure between the dual stack lite and IPv4 device may create the circumstance where the AFTR receiving the outgoing traffic from the dual stack lite device may be different from AFTR receiving the inbound traffic to the dual stack lite device, the AFTRs may implement the Openflow protocol to facilitate AFTR to AFTR communications. Such communications may be used to facilitate the transfer of mapping information from one AFTR to a second AFTR, if, for example, an AFTR receives inbound traffic and does not comprise a mapping for the IPv6 address associated with IPv4 address specified by the IPv4 device.

In an illustrative configuration, the data packet comprises a physical layer configured to physically transmit the data. Additional features, such as UDP (User Datagram Protocol, a protocol designed to provide an application with the ability to select an output port), link encapsulation (to provide local area networking), and internet protocol (to provide individuals clients with global address information), may be added to the physical layer through encapsulation.

Outbound traffic, data packets sent from a device at the IPv4 address to a device at an IPv6 address may comprise encapsulated data. The network device may comprise a decapsulator 170 to decapsulate outbound encapsulated data packets. For example, the data packets from the first device may comprise encapsulated IPv4 traffic, and the decapsulator may be configured to decapsulate the IPv4 traffic.

Figure 3:
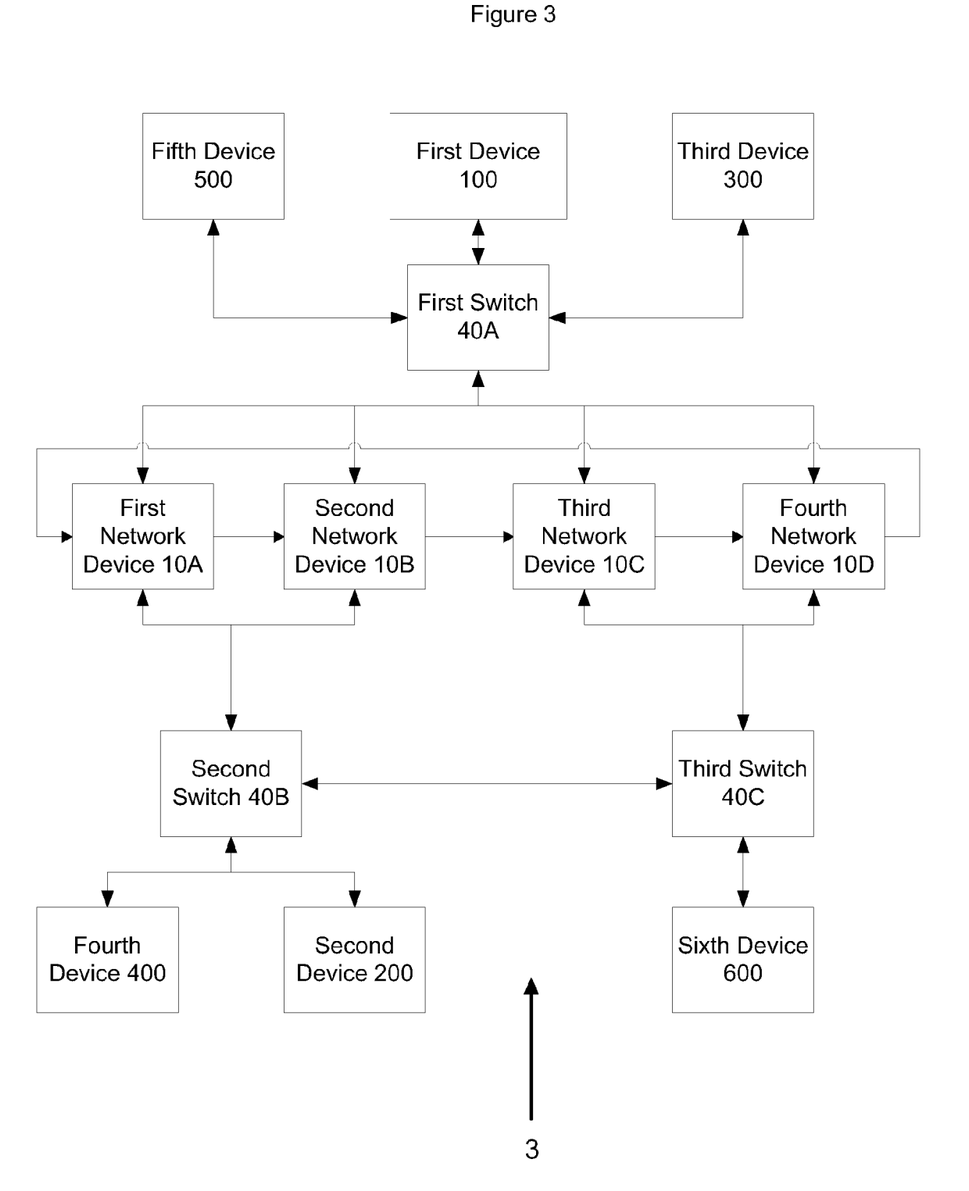
FIG. 3 is an illustrative diagram of the network.

FIG. 3 shows a network 3, according to an illustrative implementation. In this configuration of the network 3, there are six devices (100, 200, 300, 400, 500, and 600), 4 network devices (10A, 10B, 10C, and 10D), and three switches (40A, 40B, 40C). Devices 100, 300, and 500 are connected to the first switch 40A, while the fourth 400 and second device 200 are connected to the network via switch 40B, and the sixth device 600 is connected only via switch 40C.

In an illustrative communication, first device 100 sends a communication to second device 200. The communication is received at first switch 40A, where it is transferred to one of the network devices 10A-10D. Assuming the communication passes through network device 10B, network device 10B would generate a rule and store the rule in its map. The packet of data may be delivered to the second switch 40B, where it is then forwarded to the second device 200.

If the second device 200 sends a communication back to the first device 100, the communication will pass through second switch 40B. At this point, second switch 40B may send the information to network device 10A or 10B. The switch 40B may not be configured to determine which network device handled the initial communication. The switch may use other criteria (such as load, distance between the network device and the switch, time data, etc.) or no criteria when determining which network device should receive the inbound traffic. Assuming the second switch 40B sends the first network device 10A the packet, when the first network device 10A checks its map, it will determine the map does not comprise any rules relating to an address association between the first and second device. The first network device does not comprise any rules relating to this association, because the outbound traffic passed through the second network device. According to the configuration shown in FIG. 3, the network device 10A, will send a query to the network device 10B to see if the second network device comprises the requisite rule. The communication path the network device 10B may feature OpenFlow technology.

Figure 4:
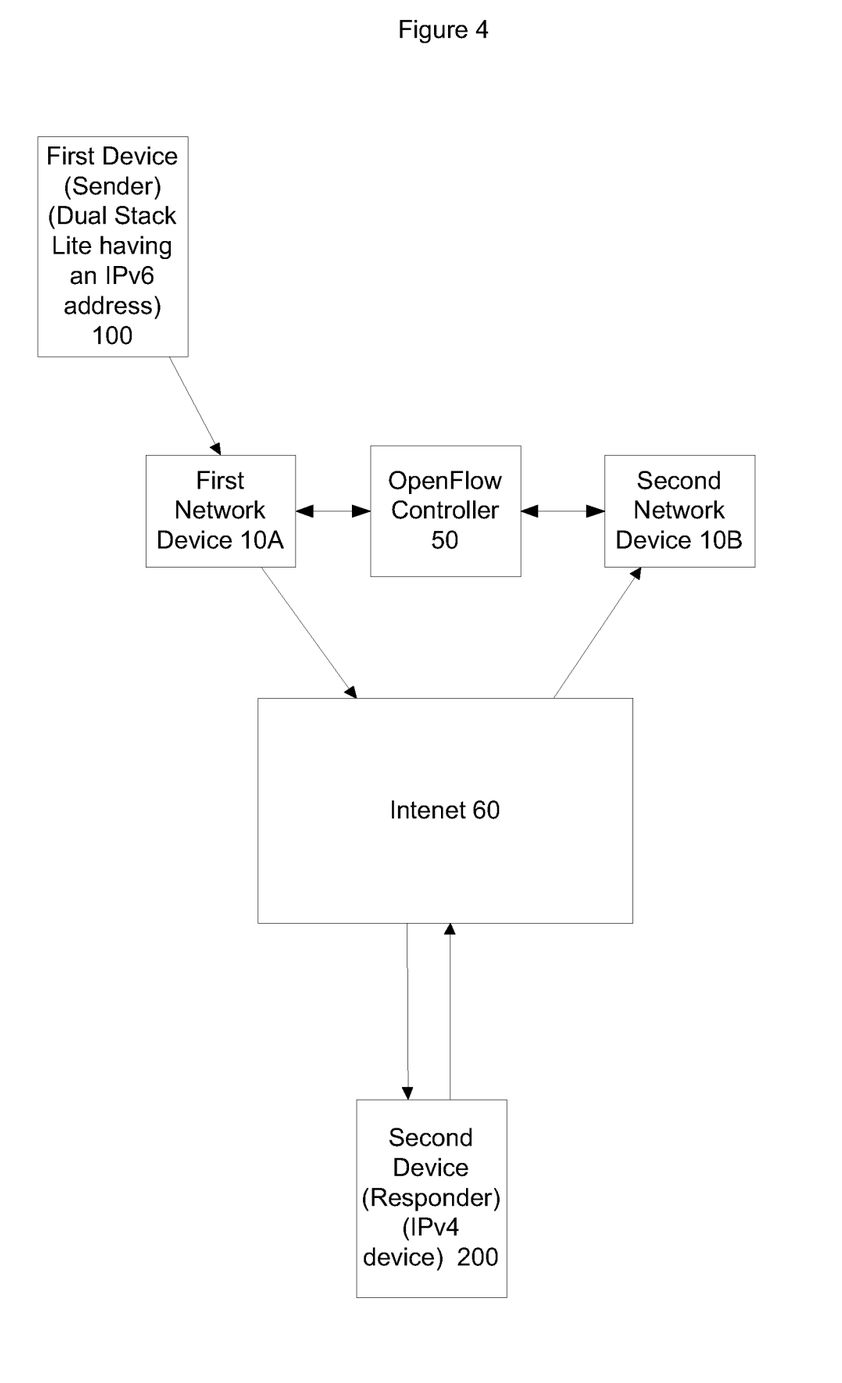
FIG. 4 is an illustrative diagram of the network featuring two network devices.

As shown in FIG. 4, the network devices may communicate using an OpenFlow controller 50 to communicate with one another. In this illustrative example, the first device (the sender) 100 can communicate with the second device (the responder) 200 through the internet 60. As illustrated, the path of the traffic starting from the first device (which may be located at an IPv4 address) to the second device (which may be located at an IPv6 address) is different from the return path. As a result when the traffic from the responder 200 reaches the second network device 10B, the second network device 10B does not contain a mapping from the first device to the second device (or vice versa), because the traffic from the first device 100 to the second device 200 went through the first network device 10A. Without mapping information, the second network device may not be able to forward the traffic to the first device 100. However, in this embodiment, the second network device can communicate with the first network device through the open flow controller 50. The OpenFlow Controller may submit a request for the mapping information to the first device, and/or transfer the traffic from the second network device 10B. In the former arrangement the OpenFlow controlled may receive the mapping data (mapping the first device and second device) from the first network device 10A, and provide that mapping date to the second network device 10B. The second network device 10B may be configured to route the traffic back to the first device once it receives the requisite mapping. In the latter arrangement, the second network device would transfer the traffic from the second device to the first network device 10A. Using it's own mapping tables, the first network device may be configured to route the traffic to the first device 100. In some embodiments, the OpenFlow controller may maintain a copy of all mapping tables that pass through the controller. second network device comprises the requisite rule. The second network device 10B may be configured to use OpenFlow to transmit the rule needed to allow the first network device to determine the address of the first device.

Figure 5:
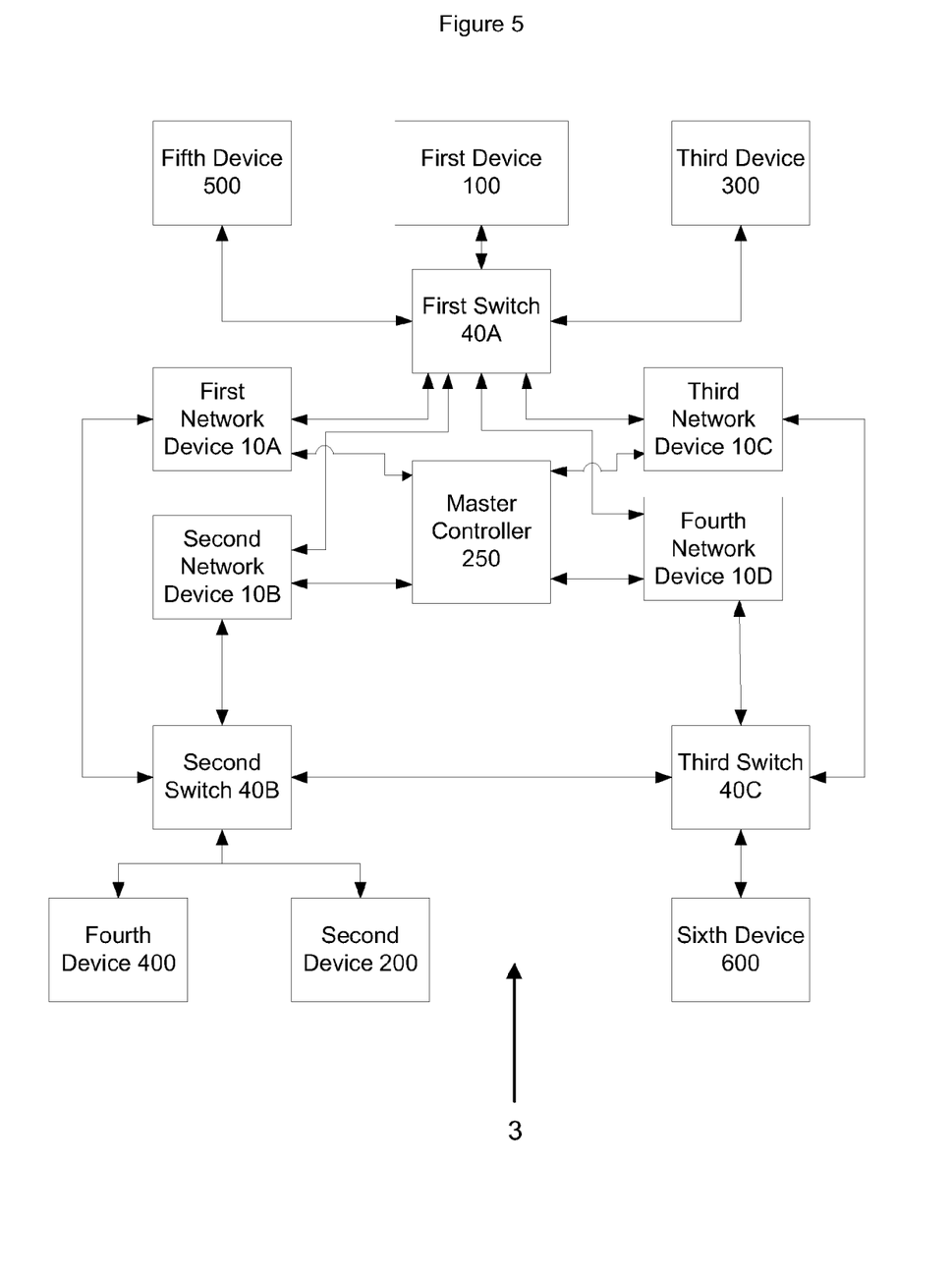
FIG. 5 is an illustrative diagram of the network featuring a master controller.

FIG. 5 shows the network 3 comprising a master controller 250. In FIG. 5, each network device is configured to distribute rules to the master controller as they are saved. As a result, the master controller 250 comprises rules for all devices that send information through the network. When queried by a network device, the master controller 250 may respond with the needed rule. Receipt of the rule would allow the network device to forward the communication to the specified device. Open Flow may be used for communication pathways between the master controller and the network devices.

In an illustrative configuration, network device (such as an address family transition router) may be deployed at each edge of the network (i.e. the edge of an administrative domain; also known as a network border) with an interface facing an upstream network. The network device (an AFTR) may be as independent systems or by enabling this functionality on existing peering routers (a peering router is a router which exchanges routing information with a router in a different autonomous system; two autonomous systems which exchange routing data and traffic are called peers). The network device may also comprise an OpenFlow client (e.g. a network element implementing a match-action table according to the OpenFlow specification) and OpenFlow controller (e.g. device in the network which programs the OpenFlow clients) code. In addition, the network device may be a border router, network device which has network connections to routers in other autonomous systems (e.g. an organization's network boundary) and which can communicate using an exterior gateway protocol such as the border gateway protocol.

Figure 6:
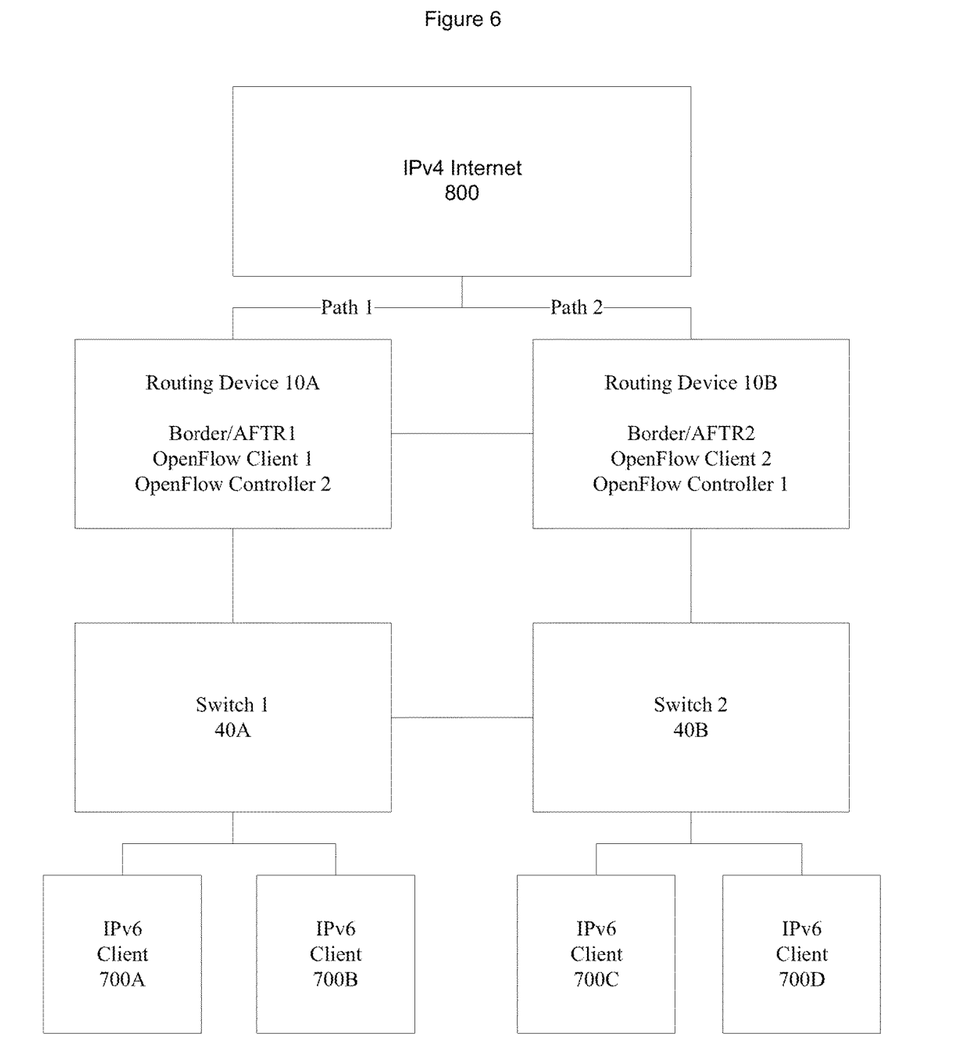
FIG. 6 is an illustrative diagram of the network featuring two network devices.

For example, in FIG. 6, routing device 10A may also be a border router, an AFTR (AFTR1), OpenFlow Client 1, and OpenFlow Controller 2. An AFTR or Address Family Translator may be any device which is a combination of an IPv4-in-IPv6 tunnel endpoint and an IPv4-IPv4 NAT (network address translator) implemented on the same node. Routing device 10B is also a border router, and AFTR 2. Routing device 10B is also OpenFlow Client 2, and OpenFlow Controller 1. Also shown in FIG. 6 are switches 1 and 2 (switch 40A and 40B), as well as four IPv6 clients (700A-700D), and the IPv4 Internet 800.

Upon receipt of downstream traffic, the network 1 may perform the following process. A packet may be sent via path 1 or path 2 to a routing device from the IPv4 Internet 800. Assuming the packet passes through path 1, a first AFTR device (AFTR 1) may check a local mapping cache for a mapping between an IPv4 address/port tuple in a destination field of the incoming packet. If the first AFTR device sees a mapping in the cache, it remaps its cache and forwards the packet to the destination IPv6 determined by the map (that is, the original sender of the traffic which generated the mapping entry) as defined in RFC 6333. If the first AFTR device sees a cache miss (meaning that it found no mapping in the mapping table, i.e. a table miss), it marks the packet with an identifier associated with itself. The AFTR device may mark the packet in various depending on the internal configuration of the device, depending on what fields in the packet are not otherwise being used for the OpenFlow communication. Upon a cache miss, the AFTR may then forward the packet along an OpenFlow control channel to a second AFTR (AFTR 2).

If AFTR2 has the appropriate mapping, it forwards the packet to the final destination by performing the required mapping. AFTR 2 may use an OpenFlow control message to install the mapping into the AFTR controller identified in the marking. The OpenFlow control message being an insertion of a mapping table entry. If AFTR2 does not have the appropriate mapping, it may add a marking for itself, and forward the packet to the AFTR established as its OpenFlow Controller (AFTR3), which may repeat the process.

If the packet visits all available AFTRs and is still a miss (i.e. each router encounters a cache miss when checking the mapping table), the packet is dropped (i.e. deleted . . . not transmitted further.) In some configurations, a notification may be delivered from the last AFTR that checked its cache to the source of the packet to let the source know the packet was dropped.

Some illustrative configurations will feature two AFTRs, but the network may feature more than two AFTRs. In networks comprising more than two AFTRs, the AFTRs may be configured so that there is a known closed path through the sequence of OpenFlow Clients and OpenFlow controllers (in this context "closed" means a loop-free path known to touch all AFTRs in the local topology). For configurations featuring two AFTRs, AFTR1 will serve as the OpenFlow client of AFTR2 for packets arriving from its peer (a device of the same class communicating with OpenFlow), but AFTR1 will serve as the OpenFlow controller for AFTR2 packets arriving from its peer AFTR3. For configurations featuring more than two routers, a virtual ring topology may be used.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code embodied on a tangible medium that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

The invention claimed is:

1. A first network device comprising:
    tangible computer readable storage media configured to store traffic information, instructions for a lookup engine, a map manager, a traffic forwarder, and a map;
    a processor configured to:
        store data in the tangible computer readable storage media, and
        execute the instructions for the lookup engine;
    a first address input configured to receive outbound traffic originating from a first computing device at a first address and destined for a second computing device at a second address, the traffic comprising a data packet and the second address of the second computing device;

the map manager configured to update, responsive to receiving the outbound traffic from the first computing device destined for the second computing device, the map stored in the tangible computer readable storage media with a first rule associating the first address of the first computing device with the second address of the second computing device;

the traffic forwarder configured to forward the outbound traffic to the second computing device;

a second address input configured to receive return traffic;

the lookup engine, executable by the processor, comprising instructions to cause the processor to:
for a first received return traffic packet comprising a first source address and a first destination address, check the map to determine whether the map comprises any rule associating the first source address with the first destination address,
responsive to a determination that the first destination address matches the first address of the first computing device and the first source address matches the second address of the second computing device, return the first rule, the instructions causing the processor to forward the first received return traffic packet to the first computing device based on the first rule,
for a second received return traffic packet comprising a second source address and a second destination address, check the map to determine whether the map comprises any rule associating the second source address with the second destination address, and
responsive to a determination that the map does not comprise any rule associating the second source address with the second destination address, cause the processor to send a query to a second network device, the query asking whether the second network device comprises any rule associating the second source address with the second destination address;

a network device input configured to receive a response to the query, the response including a second rule associating the second source address with the second destination address; and a map updater configured to update the map based on the response to the query.

2. The network device of claim 1, wherein the first address is an Internet Protocol version 6 (IPv6) address and the second address is an Internet Protocol version 4 (IPv4) address.

3. The network device of claim 1, wherein the first address is an Internet Protocol version 4 (IPv4) address and the second address is an Internet Protocol version 6 (IPv6) address.

4. The network device of claim 1, wherein the outbound traffic originating from the first computing device comprises encapsulated Internet Protocol version 4 (IPv4) traffic.

5. The network device of claim 1, comprising a decapsulator configured to decapsulate Internet Protocol version 6 (IPv6) encapsulated Internet Protocol version 4 (IPv4) traffic.

6. A system of N network devices comprising at least a first network device and a second network device, the first network device comprising:

tangible computer readable storage media configured to store traffic information, instructions for a lookup engine, a traffic forwarder, and a map;

a processor configured to:
store data in the tangible computer readable storage media, and
execute instructions for the lookup engine;

a first address input configured to receive outbound traffic originating from a first computing device at a first address and destined for a second computing device at a second address; the traffic comprising a data packet and the second address of the second computing device;

a map stored in the tangible computer readable storage media, the map comprising a first rule associating the first address of the first computing device with the second address of the second computing device;

a traffic forwarder configured to forward the outbound traffic to the second computing device;

a second address input configured to receive return traffic;

the lookup engine, executable by the processor, configured to cause the processor to:
for a first received return traffic packet comprising a first source address and a first destination address, check the map to determine whether the map comprises any rule associating the first source address with the first destination address,
responsive to a determination that the first destination address matches the first address of the first computing device and the first source address matches the second address of the second computing device, return the first rule, the instructions causing the processor to forward the first received return traffic packet to the first computing device based on the first rule,
for a second received return traffic packet comprising a second source address and a second destination address, check the map to determine whether the map comprises any rule associating the second source address with the second destination address, and
responsive to a determination that the map does not comprise any rule associating the second source address with the second destination address, cause the processor to send a query to the second network device, the query asking the second network device whether it comprises any rule associating the second source address and the second destination address;

a network device input configured to receive a response to the query, the response including a second rule associating the second source address with the second destination address; and a map updater configured to update the map based on the response to the query, wherein N is an integer greater than or equal to 2.

7. The system of claim 6, wherein the second network device is configured to:
responsive to a determination that the second network device comprises the second rule associating the second source address with the second destination address, the second network device forwards a reply comprising the second rule associating the second source address with the second destination address to the first network device.

8. The system of claim 7, wherein the first network device forwards the return traffic received from the second computing device to a switch connected to the first computing device.

9. The system of claim 7, wherein the first network device forwards the return traffic received from the second computing device to the second network device, and the second network device forwards the return traffic to a switch connected to the first computing device.

10. The system of claim 6, wherein the second network device is configured to:
responsive to a determination that the second network device does not comprise any rule associating the second source address with the second destination address, the second network device forwards the query to a third network device.

11. The system of claim 7, wherein the first network device forwards the return traffic to the first computing device.

12. The system of claim 7, wherein the first network device forwards the return traffic received from the second computing device to the second network device, and the second network device forwards the return traffic to the first computing device.

13. The system of claim 10, further comprising a third network device configured to:
determine whether the third network device comprises any rule associating the second source address with the second destination address;
responsive to a determination that the third network device comprises the second rule associating the second source address with the second destination address, the third network device forwards a reply comprising the second rule associating the second source address with the second destination address to the first network device;
responsive to a determination that the third network device does not comprise any rule associating the second source address with the second destination address, the third network device forwards the query to an Nth network device.

14. The system of claim 13, wherein the Nth network device is configured to:
determine whether the Nth network device comprises any rule associating the second source address with the second destination address;
responsive to a determination that the Nth network device comprises the second rule associating the second source address with the second destination address, the Nth network device forwards a reply comprising the second rule associating the second source address with the second destination address to the first network device;
responsive to a determination that the Nth network device does not comprise any rule associating the second source address with the second destination address, the Nth network device sends a message to the first network device indicating that the system of N network devices does not comprise any rule associating the second source address with the second destination address.

15. The system of claim 13, wherein the Nth network device is configured to:
determine whether the Nth network device comprises any rule associating the second source address with the second destination address;
responsive to a determination that the Nth network device comprises the second rule associating the second source address with the second destination address, the Nth network device forwards a reply comprising the second rule associating the second source address with the second destination address to the first network device;
responsive to a determination that the Nth network device does not comprise any rule associating the second source address with the second destination address, the Nth network device sends the query back to the first network device.

16. The system of claim 15, wherein the first network device is configured to:
receive a copy of the query from the Nth network device;
determine that none of the network devices in the system comprise any rule associating the second source address with the second destination address;
send to the second computing device a notice that the first network device cannot forward the traffic to the first computing device; and
drop the return traffic.

17. A network of N network devices comprising at least a first network device and a second network device, the first network device comprising:
tangible computer readable storage media configured to store traffic, instructions for a lookup engine, a traffic forwarder, and a map;
a processor configured to:
store data in the tangible computer readable storage media, and
execute instructions for the lookup engine;
a first address input configured to receive outbound traffic originating from a first computing device at a first address and destined for a second computing device at a second address, the traffic comprising a data packet and the second address of the second computing device;
the map stored in the tangible computer readable storage media, the map comprising a first rule associating the first address of the first computing device with the second address of the second computing device;
the traffic forwarder configured to forward the outbound traffic to the second computing device;
a second address input configured to receive return traffic;
the lookup engine, executable by the processor, configured to cause the processor to:
for a first received return traffic packet comprising a first source address and a first destination address, check the map to determine whether the map comprises any rule associating the first source address with the first destination address;
responsive to a determination that the first destination address matches the first address of the first computing device and the first source address matches the second address of the second computing device, return the first rule, the instructions causing the processor to forward the first received return traffic packet to the first computing device based on the first rule;
for a second received return traffic packet comprising a second source address and a second destination address, check the map to determine whether the map comprises any rule associating the second source address with the second destination address, and responsive to a determination that the map does not comprise any rule associating the second source address with the second destination address, cause the processor to send a query to a master controller, the query asking the master controller whether the master controller comprises any rule associating the second source address with the second destination address;

a network device input configured to receive a response to the query, the response including a second rule associating the second source address with the second destination address; and a map updater configured to update the map based on the response to the query, wherein N is greater than or equal to 2.

18. The network of claim 17, wherein all additional network devices in the system are configured to send device mapping data to the master controller so that the master controller comprises a mapping for all devices communicating in the network.

19. The network of claim 17, wherein the master controller is configured to:

determine whether the master controller comprises any rule associating the second source address with the second destination address;

responsive to a determination that the master controller comprises the second rule associating the second source address with the second destination address, the master controller forwards a reply comprising the second rule associating the second source address with the second destination address to the first network device;

responsive to a determination that the master controller does not comprise any rule associating the second source address with the second destination address, the master controller sends a reply to the first network device indicating that it does not comprise any rule associating the second source address with the second destination address.

20. The network of claim 17, wherein the first network device implements OpenFlow and address family translator routing.

21. A first network device in communication with a network of N network devices, the first network device comprising:

an Internet Protocol version 6 (IPv6) input configured to receive IPv6 encapsulated Internet Protocol version 4 (IPv4) traffic from a first computing device at an IPv6 address, the traffic being directed to a second computing device at an IPv4 address;

a map generator configured to create a map comprising a first rule associating the IPv6 address of the first computing device with the IPv4 address of the second computing device;

a decapsulator configured to decapsulate the IPv6-encapsulated IPv4 traffic;

an IPv4 traffic forwarder configured to forward the decapsulated IPv4 traffic;

an IPv4 input configured to receive return traffic;

a lookup engine configured to:

for a first received return traffic packet comprising a first IPv4 source address and a first IPv6 destination address, check the map to determine whether the map comprises any rule associating the first IPv4 source address with the first IPv6 destination address, responsive to a determination that the map does not comprise any rule associating the first IPv4 source address with the first IPv6 destination address, the lookup engine sends a query to the second network device, the query asking the second network device whether it comprises any rule associating the first IPv4 source address with the first IPv6 destination address, for a second received return traffic packet comprising a second IPv4 source address and a second IPv6 destination address, check the map to determine whether the map comprises any rule associating the second IPv4 source address with the second IPv6 destination address, and responsive to a determination that the second IPv6 destination address matches the IPv6 address of the first computing device and the second IPv4 source address matches the IPv4 address of the second computing device, return the first rule, the first network device forwarding the second return traffic packet to the first computing device;

responsive to a determination that the second network device comprises the second rule associating the first IPv4 source address with the first IPv6 destination address, the second network device forwards the second rule associating the first IPv4 source address with the first IPv6 destination address to the first network device, the first network device stores the second rule, and the first network device forwards the second return traffic packet to the first computing device located at the first IPv6 address;

responsive to a determination that the second network device does not comprise any rule associating the first IPv4 source address with the first IPv6 destination address, the second network device forwards the query to a third network device.

22. A first network device comprising:

tangible computer readable storage media configured to store traffic information, instructions for a lookup engine, a map manager, a traffic forwarder, and a map;

a processor configured to:

store data in the tangible computer readable storage media, and execute the instructions for the lookup engine;

a first address input configured to receive outbound traffic originating from a first computing device at a first address and destined for a second computing device at a second address, the traffic comprising a data packet and the second address of the second computing device;

the map manager configured to update, responsive to receiving the outbound traffic from the first computing device destined for the second computing device, the map stored in the tangible computer readable storage media with a first rule associating the first address of the first computing device with the second address of the second computing device;

the traffic forwarder configured to forward the outbound traffic to the second computing device;

a second address input configured to receive return traffic;

the lookup engine, executable by the processor, comprising instructions to cause the processor to:

for a first received return traffic packet comprising a first source address and a first destination address, check the map to determine whether the map comprises any rule associating the first source address with the first destination address, responsive to a determination that the first destination address matches the first address of the first computing device and the first source address matches the second address of the second computing device, return the first rule, the instructions causing the processor to forward the first received return traffic packet to the first computing device based on the first rule, for a second received return traffic packet comprising a second source address and a second destination address, check the map to determine whether the map comprises any rule associating the second source address with the second destination address, and responsive to a determination that the map does not comprise any rule associating the second source address with the second destination address, cause the processor to mark at least one packet of the return traffic with an identifier associated with the first network device, and forward the return traffic, including the at least one marked packet, to a second network device.

* * * * *